US009241224B2

(12) United States Patent
Kang

(10) Patent No.: US 9,241,224 B2
(45) Date of Patent: Jan. 19, 2016

(54) METHOD FOR PROVIDING HEARING AID COMPATIBILITY MODE AND ELECTRONIC DEVICE THEREOF

(71) Applicant: Samsung Electronics Co., Ltd., Gyeonggi-do (KR)

(72) Inventor: Sung-Geun Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/242,291

(22) Filed: Apr. 1, 2014

(65) Prior Publication Data

US 2014/0376755 A1   Dec. 25, 2014

(30) Foreign Application Priority Data

Jun. 25, 2013   (KR) .................. 10-2013-0073059

(51) Int. Cl.
*H04R 25/00*   (2006.01)
*H04M 1/725*   (2006.01)

(52) U.S. Cl.
CPC ........... *H04R 25/50* (2013.01); *H04M 1/72591* (2013.01); *H04R 25/558* (2013.01); *H04R 25/305* (2013.01); *H04R 25/554* (2013.01); *H04R 25/602* (2013.01)

(58) Field of Classification Search
USPC ........... 381/314, 320, 321, 323, 329; 320/106
See application file for complete search history.

(56) References Cited

U.S. PATENT DOCUMENTS

| | | | | |
|---|---|---|---|---|
| 5,237,257 A * | 8/1993 | Johnson et al. | ............... | 320/106 |
| 5,842,115 A * | 11/1998 | Dent | ............... | 455/73 |
| 6,122,500 A * | 9/2000 | Dent et al. | ............... | 455/414.1 |
| 7,157,882 B2 * | 1/2007 | Johnson | ............... | B25F 5/02 |
| | | | | 320/134 |
| 7,248,713 B2 * | 7/2007 | Bren et al. | ............... | 381/331 |
| 7,382,270 B2 * | 6/2008 | Wendelrup et al. | ......... | 340/636.1 |
| 7,397,926 B1 * | 7/2008 | Frerking | ............... | 381/315 |
| 7,557,540 B2 * | 7/2009 | Kao et al. | ............... | 320/132 |
| 7,634,098 B2 * | 12/2009 | Townsend et al. | ............... | 381/321 |
| 7,773,943 B2 * | 8/2010 | Zurek et al. | ............... | 455/41.1 |
| 8,169,185 B2 * | 5/2012 | Partovi et al. | ............... | 320/108 |
| 8,363,872 B2 * | 1/2013 | Wiggins et al. | ............... | 381/328 |
| 8,606,333 B2 * | 12/2013 | Frerking et al. | ............... | 455/569.1 |
| 8,638,948 B2 * | 1/2014 | Schuijers et al. | ............... | 381/17 |
| 8,682,014 B2 * | 3/2014 | Dave et al. | ............... | 381/317 |
| 8,842,860 B2 * | 9/2014 | Jang et al. | ............... | 381/312 |
| 2003/0059076 A1 * | 3/2003 | Martin | ............... | 381/331 |
| 2004/0037443 A1 * | 2/2004 | Beimel et al. | ............... | 381/321 |
| 2007/0126402 A1 * | 6/2007 | Tsai et al. | ............... | 320/134 |
| 2008/0238357 A1 * | 10/2008 | Bourilkov | ............... | H02J 7/0006 |
| | | | | 320/106 |
| 2009/0257610 A1 * | 10/2009 | Wu | ............... | H04R 25/00 |
| | | | | 381/323 |
| 2012/0289218 A1 | 11/2012 | Hawker et al. | | |
| 2013/0034234 A1 * | 2/2013 | Chen et al. | ............... | 381/58 |
| 2013/0259278 A1 * | 10/2013 | Kill et al. | ............... | 381/318 |
| 2013/0272556 A1 * | 10/2013 | Hamacher | ............... | 381/328 |

* cited by examiner

*Primary Examiner* — Brian Miller
(74) *Attorney, Agent, or Firm* — Cha & Reiter, LLC.

(57) ABSTRACT

An apparatus and method for providing a Hearing Aid Compatibility (HAC) mode in an electronic device are provided, including detecting a type of battery, and applying an audio adjusting parameter for the HAC mode according to the detected type of battery.

14 Claims, 9 Drawing Sheets

| | ID RESISTANCE VALUE (601) | MANUFACTURER (603) | SIGNAL LEVEL (605) |
|---|---|---|---|
| 611 | 25k~26k | 1ST MANUFACTURER | +2 |
| 613 | 26.5k~27.5k | 2ND MANUFACTURER | +3 |
| 615 | 28k~29K | 3RD MANUFACTURER | - |

FIG.6

| MANUFACTURER | SIGNAL LEVEL | NOISE LEVEL | SNNR | RATING |
|---|---|---|---|---|
| 1ST MANUFACTURER | −5.65 | −37.85 | 32.2 | T4 |
| 2ND MANUFACTURER | −6.58 | −22.77 | 16.19 | T2 |
| 3RD MANUFACTURER | −6.73 | −27.7 | 20.97 | T3 |

FIG.7A

| MANUFACTURER 701 | SIGNAL LEVEL 703 | NOISE LEVEL 705 | SNNR 707 | RATING 709 |
|---|---|---|---|---|
| 1ST MANUFACTURER 711-1 | −7.65 | −36.21 | 28.56 | T3 |
| 2ND MANUFACTURER 713-1 | −3.58 | −23.68 | 20.1 | T3 |
| 3RD MANUFACTURER 715-1 | −6.73 | −27.7 | 20.97 | T3 |

FIG.7B

METHOD FOR PROVIDING HEARING AID COMPATIBILITY MODE AND ELECTRONIC DEVICE THEREOF

CROSS REFERENCE TO RELATED APPLICATION

This application claims priority under 35 U.S.C. §119(a) to a Korean Patent Application filed in the Korean Intellectual Property Office on Jun. 25, 2013 and assigned Serial No. 10-2013-0073059, the contents of which are herein incorporated by reference.

TECHNICAL FIELD

The present disclosure relates to hearing aids, and, more particularly to a Hearing Aid Compatibility (HAC) mode and an electronic device thereof.

BACKGROUND

Recently, with the growth of mobile communication technologies, portable electronic devices providing various services beyond mere voice calling have become necessities of the modern world. These electronic devices are widely used because of their broad range of functionality. However, deaf persons have many difficulties in using portable electronic devices.

Typically, deaf users operate the electronic devices with the assistance of a hearing aid. A basic structure of the hearing aid is composed of a microphone, an amplifier, and a receiver. The microphone converts an analog signal into a digital signal and sends the digital signal to the amplifier. The amplifier converts an amplified sound into an analog signal and forwards the analog signal to the receiver to provide a voice signal to people with impaired hearing. Also, a telecoil may be installed in the hearing aid to sense an electromagnetic wave generated in the electronic device and provide the electromagnetic wave as a voice signal.

Unfortunately, when deaf users utilize hearing aids in tandem with portable electronic devices, a howling phenomenon takes place. Here, the howling phenomenon refers to an unusual sound generated by a kind of resonance, in which a volume of any specific frequency zone (i.e., an amplitude) increases in geometrical progression because a sound input to the microphone of the hearing aid is repetitively amplified through the amplifier, outputted through the receiver, fed back through the microphone, again amplifying the sound, and again outputting the amplified sound through the receiver, etc.

The United States of America requires by law that electronic device manufacturers implement HAC so that deaf persons suffers no undue inconvenience operation portable electronic devices of the USA. Consumer electronic device manufacturers thus produce electronic device products that are operable by persons with impaired hearing.

SUMMARY

One aspect of the present application is to provide an apparatus and method implementing a Hearing Aid Compatibility (HAC) mode in an electronic device.

Another aspect of the present application is to provide an apparatus and method implementing a HAC mode when providing a call service in an electronic device.

A further aspect of the present application is to provide an apparatus and method implementing a HAC mode of the same performance by applying an audio parameter according to the kind of battery in an electronic device.

Yet another aspect of the present application is to provide an apparatus and method implementing the kind of battery according to a resistance value of an Identification (ID) pin included in the battery in an electronic device.

The above aspects may be achieved by providing a method implementing a hearing aid compatibility mode and an electronic device thereof.

According to one example embodiment, a method implementing a HAC mode in an electronic device is provided. The method includes the operations of, if activating the HAC mode, confirming the kind of battery, and applying an audio parameter for the HAC mode according to the kind of battery.

According to another example embodiment, an electronic device includes at least one memory for storing data and instructions, at least one battery, and at least one processor. If activating a HAC mode, the processor confirms the kind of the battery, and applies an audio parameter for the HAC mode according to the kind of the battery.

BRIEF DESCRIPTION OF THE DRAWINGS

The above and other aspects of the electronic device and method thereof will become more apparent from the following detailed description, when taken in conjunction with the accompanying drawings, in which:

FIG. 6 is a diagram illustrating the classification of batteries dependent on an Identification (ID) resistance value of a battery according to various example embodiments of the present application;

FIG. 7A and FIG. 7B are diagrams illustrating a magnetic field signal and a magnetic field noise level of an electronic device according to various example embodiments of the present application.

DETAILED DESCRIPTION

Example embodiments of the present application will be described herein below with reference to the accompanying drawings. In the following description, well-known functions or implementations are not described in detail since they would obscure the disclosure in unnecessary detail. Additionally, terms used below are defined in light of functions described in the present application, and may thus be different depending on user or manufacturer intention or practice. Therefore, the terms should be defined on the basis of the disclosure throughout this specification.

The present application relates to an apparatus and method for providing a Hearing Aid Compatibility (HAC) mode in an electronic device.

The electronic device can include a mobile communication terminal, a Personal Digital Assistant (PDA), a laptop computer, a smart phone, a netbook, a television, a Mobile Internet Device (MID), a Ultra Mobile Personal Computer (UMPC), a tablet PC, a navigator, a digital refrigerator, a digital watch, and an MPEG Audio Layer-3 (MP3).

FIGS. 7A and 7B illustrate a magnetic field signal and a magnetic field noise level of an electronic device according to various example embodiments.

Referring to FIG. 7A, the electronic device has different Telecoil ratings (T4, T2, and T3) 709 for HAC according to the kinds of batteries (as listed by manufacturer) 711, 713, and 715. Therefore, to implement HAC, an electronic device manufacturer must choose, for example, at least one of the battery 711 of a 1st manufacturer, the battery 713 of a 2nd manufacturer, or the battery 715 of a 3rd manufacturer. At this time, if the electronic device manufacturer implements HAC via one particularly manufacturer battery, he/she cannot use batteries other than the chosen battery. A failure of supply from the manufacturer of the chosen battery therefore results in a serious problem in which the electronic device manufacturer can no longer supply HAC enabled electronic devices to the market.

Accordingly, a method and apparatus is disclosed herein capable of adjusting a signal level to achieve a desired Telecoil rating (T3) irrespective of the chosen battery 711-1, 713-1, and 715-1 (as illustrated in FIG. 7B). Although this particular embodiment involves altering the signal level, this should not be construed to limit the disclosure, which may include changing any parameter affecting a "Signal plus Noise to Noise Ratio" (SNNR) value that may be utilized as a reference value for implementing HAC.

Figure 1:
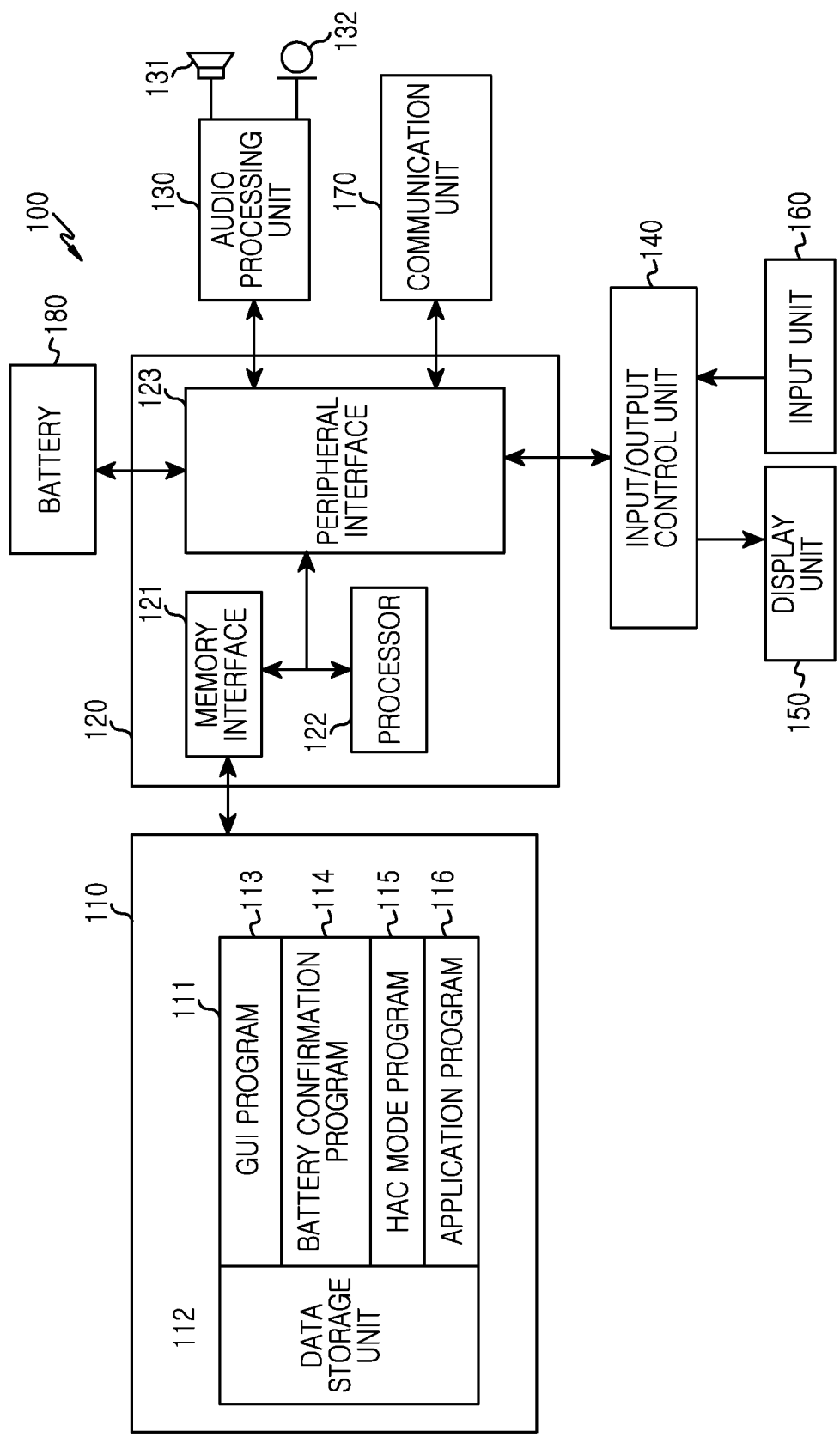
FIG. 1 is a block diagram illustrating an electronic device according to various example embodiments of the present application.

FIG. 1 is a block diagram illustrating an electronic device according to various example embodiments of the disclosure.

As illustrated in FIG. 1, the electronic device 100 can include a memory 110, a processor unit 120, an audio processing unit 130, an input/output control unit 140, a display unit 150, an input unit 160, a communication unit 170, and a battery 180. Here, the memory 110 may exist in plural.

The memory 110 includes a program storage unit 111 storing a program for controlling an operation of the electronic device 100 and a data storage unit 112 storing data generated during program execution.

The program storage unit 111 includes a Graphical User Interface (GUI) program 113, a battery confirmation program 114, a HAC mode program 115, and at least one application program 116. Here, the program included in the program storage unit 111 is a set of instructions and may be expressed as an instruction set.

The data storage unit 112 stores, as illustrated in FIG. 6, a battery manufacturer 603 dependent on an Identification (ID) resistance value 601, and a signal level value 605 for changing an SNNR.

The GUI program 113 includes at least one software constituent element for providing a user interface by graphic on the display unit 150. For example, the GUI program 113 is configured to display on the display unit 150 information of an application program driven by the processor 122.

Figure 3:
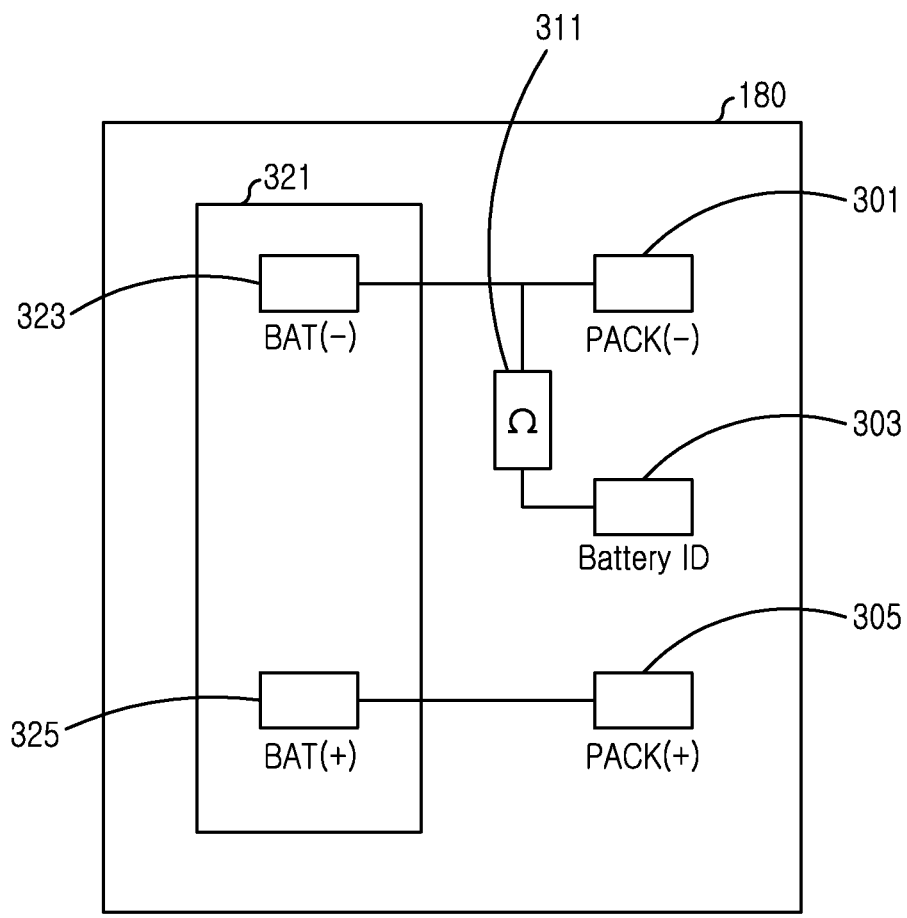
FIG. 3 is a detailed block diagram illustrating a battery according to various example embodiments of the present application.

The battery confirmation program 114 includes at least one software element for confirming the type of the battery 180 according to a resistance value of an ID pin included in the battery 180. For example, if there is a battery confirmation request from the HAC mode program 115, the battery confirmation program 114 confirms, as illustrated in FIG. 3, the kind of the battery 180 according to a resistance value 311 between an ID pin (i.e., a Voltage-to-Frequency or "VF" terminal) 303 and a negative terminal 301 which are included in the battery 180. For example, as illustrated in FIG. 6, if the resistance value of the battery 180 is sensed within a range of 25 kΩ to 26 kΩ, the battery confirmation program 114 recognizes the battery 180 as the battery of the 1st manufacturer (611). Alternatively, if the resistance value of the battery 180 is sensed within a range of 26.5 kΩ to 27.5 kΩ, the battery confirmation program 114 may recognize the battery 180 as the battery of the 2nd manufacturer (613). Also, if the resistance value of the battery 180 is sensed within a range of 28 kΩ to 29 kΩ, the battery confirmation program 114 may recognize the battery 180 as the battery of the 3rd manufacturer (615).

The HAC mode program 115 includes at least one software constituent element for applying an audio parameter according to the kind of battery. For example, while activating a HAC mode, the HAC mode program 115 confirms the kind of the battery 180 through the battery confirmation program 114. After confirming the kind of the battery 180, the HAC mode program 115 applies the audio parameter for the HAC mode according to the type of the battery 180. The HAC mode program 115 applies the audio parameter so as to apply a preset SNNR value. At this time, the HAC mode program 115 changes a signal level value of the electronic device 100 using at least one of a gain, a frequency filter, an Automatic Gain Control (AGC), or a Dynamic Range Control (DRC). As illustrated in FIG. 6, when the battery 180 is determined to be the battery of the 1st manufacturer, the HAC mode program 115 increases the signal level by a factor of "2" (611). Also, when the battery is determined to be the battery of the 2nd manufacturer, the HAC mode program 115 can increase the signal level by a factor of "3" (613). Also, when the battery is determined to be of the 3rd manufacturer, the HAC mode program 115 may maintain the signal level (615).

Referring again to FIG. 1, the application program 116 includes a software constituent element for at least one application program installed in the electronic device 100.

The processor unit 120 includes a memory interface 121, at least one processor 122 and peripheral interface 123. Here, the memory interface 121, the at least one processor 122 and peripheral interface 123 are included in the processor unit 120, and can be integrated as at least one integrated circuit, or implemented as separate constituent elements.

The memory interface 121 controls the access of a constituent element such as the processor 122 or the peripheral interface 123 to the memory 110.

The peripheral interface 123 controls the connection of the processor 122 and the memory interface 121 with an input/output peripheral device of the electronic device 100.

Figure 2:
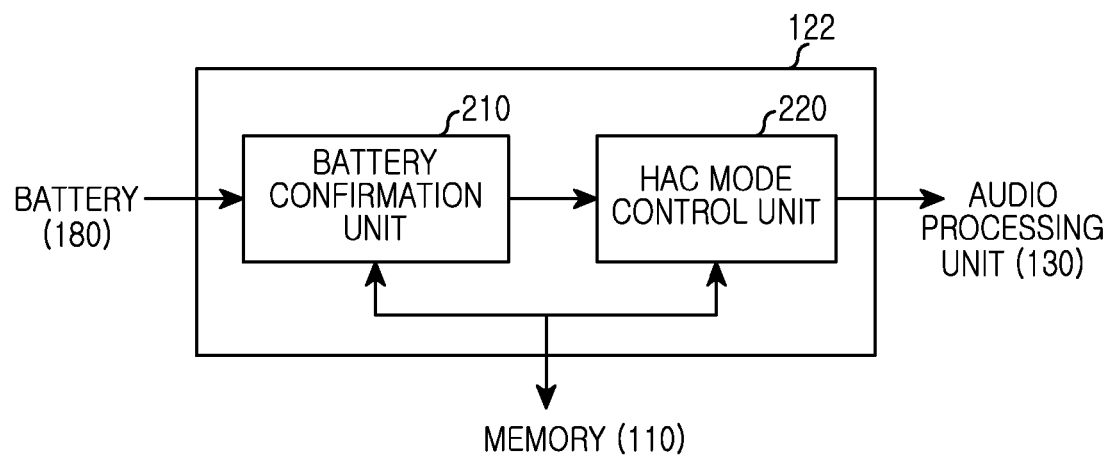
FIG. 2 is a detailed block diagram illustrating a processor according to various example embodiments of the present application.

The processor 122 controls the electronic device 100 and provides various services using at least one software program. At this time, the processor 122 executes at least one program stored in the memory 110 and provides a service according to the executed program. For example, the processor 122 can be implemented as illustrated in FIG. 2 to execute the battery confirmation program 114 that confirms the type of the battery 180, according to the resistance value of the ID pin included in the battery 180, and to execute the HAC mode program 115 to apply the audio parameter according to the type of the battery 180.

The audio processing unit 130 can provide an audio interface between a user and the electronic device 100 through the speaker 131 and the microphone 132.

The input/output control unit 140 provides an interface between an input/output device such as the display unit 150, the input unit 160 and the like, and the peripheral interface 123.

The display unit 150 displays status information of the electronic device 100, characters input by a user, a moving picture, and a still picture. For example, the display unit 150 displays information of an application program driven by the processor 122.

The input unit 160 provides input data generated by user's selection to the processor unit 120 via the input/output control unit 140. In an example embodiment, the input unit 160 can include a key pad including at least one hardware button, and a touch pad sensing touch information. For example, the input unit 160 can provide the touch information sensed through the touch pad to the processor 122 via the input/output control unit 140.

The communication unit 170 includes at least one software constituent element for performing a communication function for voice communication and data communication. In an example embodiment, the communication unit 170 may be divided into a plurality of communication sub modules supporting different communication networks. For example, the communication network can include a number of networks such as, but not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a wireless Local Area Network (LAN), a Bluetooth network, and a Near Field Communication (NFC) network.

FIG. 2 is a detailed block diagram illustrating a processor according to various example embodiments.

As illustrated in FIG. 2, the processor 122 can include a battery confirmation unit 210 and a HAC mode control unit 220.

The battery confirmation unit 210 executes the battery confirmation program 114 of the program storage unit 111 to confirm the type of the battery 180 according to the resistance value of the ID pin included in the battery 180. For example, if there is a battery confirmation request from the HAC mode control unit 220, the battery confirmation unit 210 confirms, as illustrated in FIG. 3, the kind of the battery 180 according to a resistance value 311 between an ID pin (i.e., a VF terminal) 303 and a negative terminal 301 which are included in the battery 180. For example, as illustrated in FIG. 6, if the resistance value of the battery 180 is determined to be within a range of 25 kΩ to 26 kΩ, the battery confirmation unit 210 recognizes the battery 180 as the battery of the 1st manufacturer (611). Also, if the resistance value of the battery 180 is determined to be within a range of 26.5 kΩ to 27.5 kΩ, the battery confirmation unit 210 can recognize the battery 180 as the battery of the 2nd manufacturer (613). Also, if the resistance value of the battery 180 is determined to be within a range of 28 kΩ to 29 kΩ, the battery confirmation unit 210 may recognize the battery 180 as the battery of the 3rd manufacturer (615).

The HAC mode control unit 220 controls to execute the HAC mode control unit 220 of the program storage unit 111 to apply an audio parameter according to the kind of the battery 180. For example, if activating a HAC mode, the HAC mode control unit 220 confirms the kind of the battery 180 through the battery confirmation unit 210. After confirming the kind of the battery 180, the HAC mode control unit 220 applies the audio parameter for the HAC mode according to the kind of the battery 180. For example, the HAC mode control unit 220 applies the audio parameter so as to apply a preset SNNR value. At this time, the HAC mode control unit 220 changes a signal level value of the electronic device 100 using at least one of a gain, a frequency filter, an AGC, or a DRC. As illustrated in FIG. 6, when it is the battery of the 1st manufacturer, the HAC mode control unit 220 increases the signal level by "2" (611). Also, when it is the battery of the 2nd manufacturer, the HAC mode control unit 220 can increase the signal level by "3" (613). Also, when it is the battery of the 3rd manufacturer, the HAC mode control unit 220 may maintain the signal level (615).

In the aforementioned example embodiment, the battery confirmation unit 210 of the electronic device executes the battery confirmation program 114 to confirm the kind of the battery 180.

In another example embodiment, the electronic device may include a separate battery confirmation module including the battery confirmation program 114.

In the aforementioned example embodiment, the HAC mode control unit 220 of the electronic device executes the HAC mode program 115 to apply the audio parameter according to the kind of the battery 180.

In another example embodiment, the electronic device may include a separate HAC mode control module including the HAC mode program 115.

Figure 4:
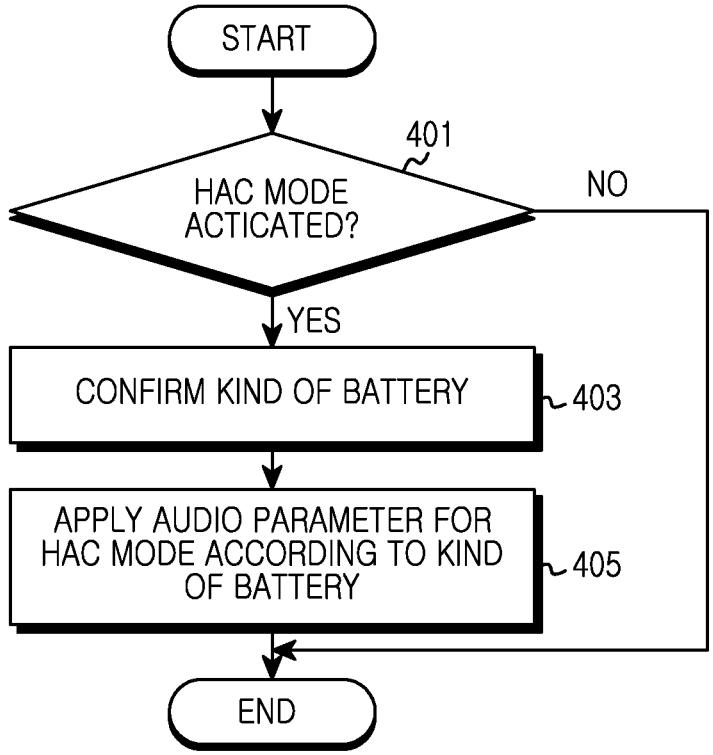
FIG. 4 is a flowchart illustrating a procedure for applying an audio parameter for a Hearing Aid Compatibility (HAC) mode according to the kind of battery in an electronic device according to an example embodiment of the present application.

FIG. 4 illustrates a procedure for applying an audio parameter for a HAC mode according to the kind of battery in an electronic device according to an example embodiment.

Referring to FIG. 4, in operation 401, the electronic device determines if it activates the HAC mode. For example, the electronic device determines if an item activating the HAC mode is selected in a HAC mode setting menu. For another example, if a preset gesture is sensed, the electronic device may activate the HAC mode. For further example, if a hearing aid exists around the electronic device, the electronic device may activate the HAC mode. At this time, the electronic device may set to activate the HAC mode during a reference time. If not activating the HAC mode, the electronic device can terminate the algorithm.

Meanwhile, if activating the HAC mode, in operation 403, the electronic device confirms the type of battery. For example, the electronic device confirms, as illustrated in FIG. 3, the type of the battery 180 according to a resistance value 311 between an ID pin (i.e., a VF terminal) 303 and a negative terminal 301 which are included in the battery 180. For example, as illustrated in FIG. 6, if the resistance value of the battery 180 is sensed within a range of 25 kΩ to 26 kΩ, the electronic device recognizes the battery 180 as the battery of the 1st manufacturer (611). Also, if the resistance value of the battery 180 is sensed within a range of 26.5 kΩ to 27.5 kΩ, the electronic device can recognize the battery 180 as the battery of the 2nd manufacturer (613). Also, if the resistance value of the battery 180 is sensed within a range of 28 kΩ to 29 kΩ, the electronic device may recognize the battery 180 as the battery of the 3rd manufacturer (615).

After confirming the type of battery, the electronic device applies an audio parameter for the HAC mode according to the kind of battery. For example, the electronic device applies the audio parameter so as to apply a preset SNNR value. At this time, the electronic device changes a signal level value of the electronic device using at least one of a gain, a frequency filter, an AGC, or a DRC. For example, as illustrated in FIG. 6, when it is the battery of the 1st manufacturer, the electronic device increases the signal level by "2" (611). Also, when it is the battery of the 2nd manufacturer, the electronic device can increase the signal level by "3" (613). Also, when it is the battery of the 3rd manufacturer, the electronic device may maintain the signal level (615).

Next, the electronic device can terminate the algorithm.

In the aforementioned example embodiment, the electronic device applies the audio parameter for the HAC mode according to the kind of battery.

Figure 5:
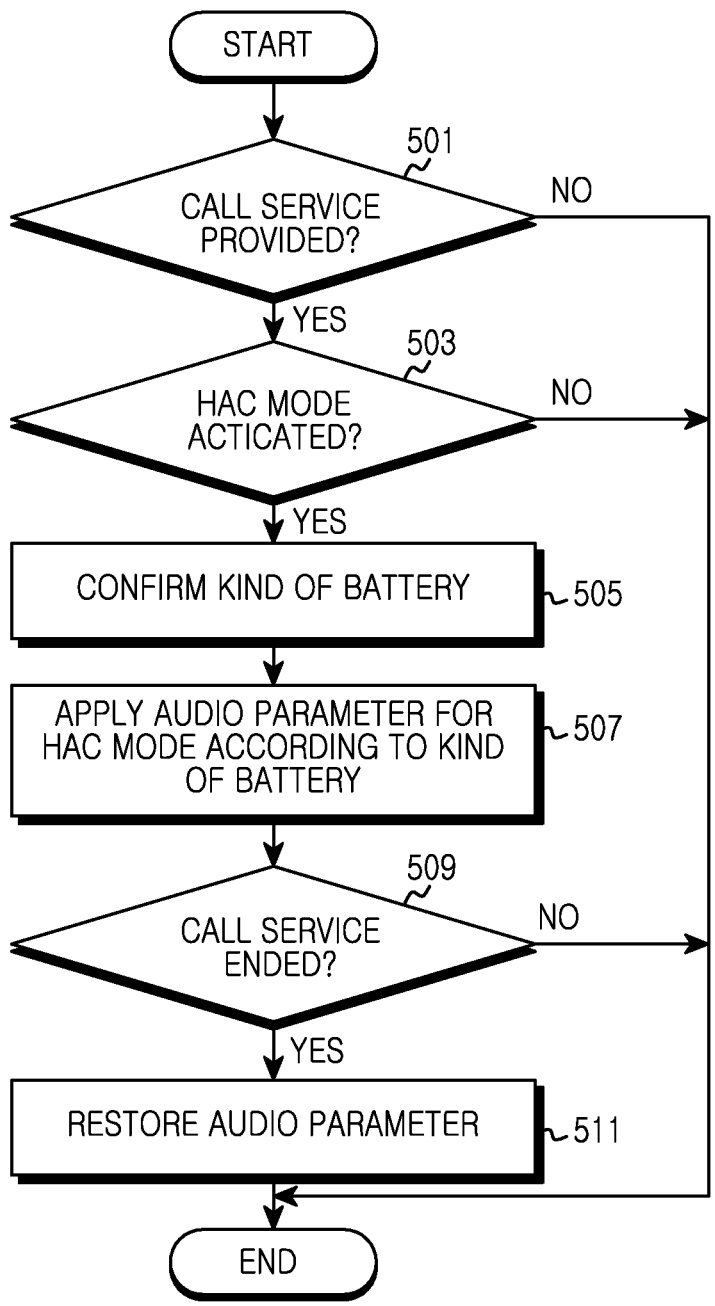
FIG. 5 is a flowchart illustrating a procedure for applying an audio parameter for a HAC mode according to the kind of battery when providing a call service in an electronic device according to another example embodiment of the present application.

In another example embodiment, the electronic device may apply the audio parameter for the HAC mode according to the kind of battery when providing a call service as illustrated in FIG. 5 below.

FIG. 5 illustrates a procedure for applying an audio parameter for a HAC mode according to the kind of battery when providing a call service in an electronic device according to another example embodiment.

Referring to FIG. 5, in operation 501, the electronic device determines if it provides the call service. For example, the electronic device determines if there is a request for at least one of call receiving or call originating through the communication unit 170. If not providing the call service in operation 501, the electronic device can terminate the algorithm.

Meantime, when providing the call service, in operation 503, the electronic device determines if it activates the HAC mode. For example, the electronic device determines if an item of activating the HAC mode is selected in a HAC mode setting menu. For another example, if a preset gesture is sensed, the electronic device may activate the HAC mode. For further example, if a hearing aid exists around the electronic device, the electronic device may activate the HAC mode. At this time, the electronic device may set to activate the HAC mode during a reference time. If not activating the HAC mode, the electronic device can terminate the algorithm.

Meantime, if activating the HAC mode, in operation 505, the electronic device confirms the kind of battery. For example, the electronic device confirms, as illustrated in FIG. 3, the kind of the battery 180 according to a resistance value 311 between an ID pin (i.e., a VF terminal) 303 and a negative terminal 301 which are included in the battery 180. For example, as illustrated in FIG. 6, if the resistance value of the battery 180 is determined to be within a range of 25 kΩ to 26 kΩ, the electronic device recognizes the battery 180 as the battery of the 1st manufacturer (611). Also, if the resistance value of the battery 180 is determined to be within a range of 26.5 kΩ to 27.5 kΩ, the electronic device can recognize the battery 180 as the battery of the 2nd manufacturer (613). Also, if the resistance value of the battery 180 is determined to be within a range of 28 kΩ to 29 kΩ, the electronic device may recognize the battery 180 as the battery of the 3rd manufacturer (615).

After confirming the type of battery, in operation 507, the electronic device applies an audio parameter for the HAC mode according to the type of battery. For example, the electronic device applies the audio parameter so as to apply a preset SNNR value. At this time, the electronic device changes a signal level value of the electronic device using at least one of a gain, a frequency filter, an AGC, or a DRC. For example, as illustrated in FIG. 6, when it is the battery of the 1st manufacturer, the electronic device increases the signal level by a factor "2" (611). Also, when it is the battery of the 2nd manufacturer, the electronic device can increase the signal level by a factor of "3" (613). Also, when it is the battery of the 3rd manufacturer, the electronic device may maintain the signal level (615).

In operation 509, the electronic device determines if it ends the call service. For example, the electronic device determines if it ends at least one operation among the call receiving, the call originating, and call connection through the communication unit 170. If the call service is not ended in operation 509, the electronic device can terminate the algorithm. Also, if the call service is not ended, the electronic device may maintain the audio parameter applied in operation 507.

Meantime, if ending the call service, in operation 511, the electronic device restores the audio parameter. For example, if the electronic device ends the at least one operation among the call receiving, the call originating, and the call connection through the communication unit 170, the electronic device restores the audio parameter applied in operation 507 to the original state.

Next, the electronic device can terminate the algorithm.

Additionally, if ending the call service, the electronic device may maintain the audio parameter applied in operation 507.

In the aforementioned example embodiment, if activating the HAC mode and if providing the call service, the electronic device applies the audio parameter for the HAC mode according to the kind of battery.

In another example embodiment, the electronic device may determine the activation or non-activation of the HAC mode at a time point at which the electronic device converts from an OFF state to an ON state.

Figure 8:
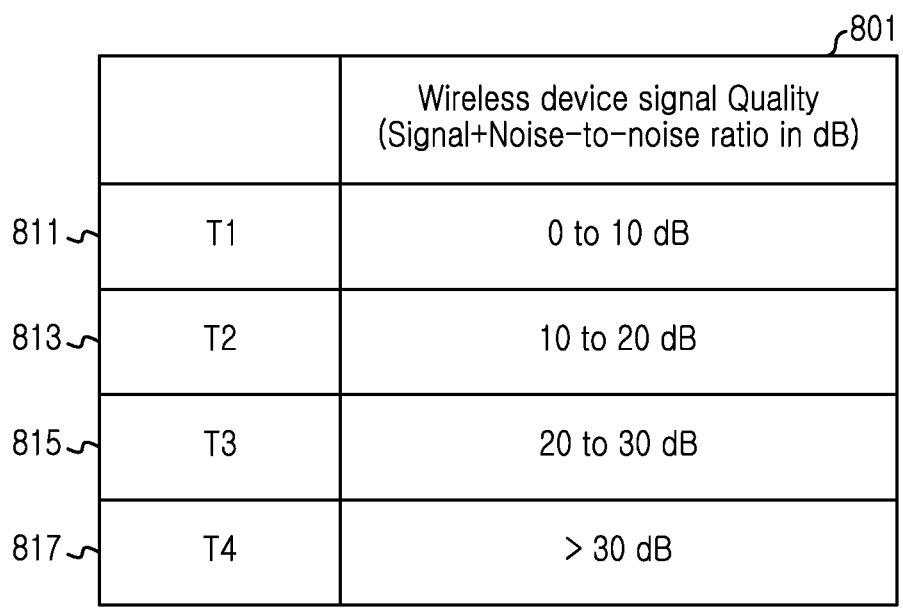
FIG. 8 is a diagram illustrating an electronic device signal quality for HAC according to various example embodiments of the present application.

FIG. 8 illustrates an example of an electronic device signal quality 801 for HAC for a hearing aid with a telecoil according to various example embodiments. The electronic device guarantees a signal quality equal to or greater than T3 (815) or better T4 (817) to implement HAC.

As described above, example embodiments may facilitate the same performance for a HAC mode irrespective of the kind of battery, by applying an audio parameter for the HAC mode according to the kind of battery when providing the HAC mode in an electronic device.

It will be appreciated that embodiments according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The functions and process steps herein may be performed automatically or wholly or partially in response to user command. An activity (including a step) performed automatically is performed in response to executable instruction or device operation without user direct initiation of the activity.

While the invention has been shown and described with reference to certain example embodiments thereof, it will be understood by those skilled in the art that various changes in form and details may be made therein without departing from the disclosure of the invention as defined by the appended claims.

What is claimed is:

1. A method for providing a Hearing Aid Compatibility (HAC) mode in an electronic device, the method comprising the steps of:
   detecting a type of a battery comprising at least one terminal for outputting power and an identification terminal for identifying the type of the battery; and
   applying an audio adjusting parameter for the HAC mode to the electronic device based on the detected type of the battery,
   wherein the step of detecting the type of the battery comprises:
   detecting a resistance value from the identification terminal of the battery; and
   detecting the type of the battery based on the resistance value.

2. The method of claim 1, further comprising the step of:
   generating a magnetic field according to the audio adjusting parameter.

3. The method of claim 1, wherein the at least one terminal comprises a negative terminal connected to the identification terminal, and
   wherein the step of detecting the resistance value comprises the step of:
   detecting the resistance value between the negative terminal and the identification terminal.

4. The method of claim 1, wherein the step of applying the audio adjusting parameter comprises the step of:
   applying a preset Signal plus Noise to Noise Ratio (SNNR) value.

5. The method of claim 1, wherein the step of applying the audio adjusting parameter comprises the step of:
   changing a signal level value of the electronic device using at least one of a gain, a frequency filter, an Automatic Gain Control (AGC), and a Dynamic Range Control (DRC).

6. The method of claim 1,
   wherein the HAC mode is activated in response to a request for at least one of call receiving or call originating.

7. The method of claim 1,
   wherein the HAC mode is activated in response to powering on the electronic device.

8. An electronic device having a Hearing Aid Compatibility (HAC) mode, comprising:
   at least one memory configured to store data and instructions;
   at least one battery comprising at least one terminal for outputting power and an identification terminal for identifying a type of the battery; and
   at least one processor configured to:
   detect a resistance value from the identification terminal of the battery;
   detect the type of the battery based on the resistance value, and
   apply an audio adjusting parameter for the HAC mode to the electronic device based on the detected type of the at least one battery.

9. The electronic device of claim 8, wherein the at least one processor is further configured to:
   generate a magnetic field according to the audio adjusting parameter.

10. The electronic device of claim 8, wherein the at least one terminal comprises a negative terminal connected to the identification terminal, and
    wherein the at least one processor is further configured to:
    detect the resistance value between the negative terminal and the identification terminal.

11. The electronic device of claim 8, wherein the applying an audio adjusting parameter comprises applying a preset Signal plus Noise to Noise Ratio (SNNR) value.

12. The electronic device of claim 8, wherein, when applying the audio adjusting parameter, the at least one processor is configured to change a signal level value of the electronic device using at least one of a gain, a frequency filter, an Automatic Gain Control (AGC), and a Dynamic Range Control (DRC).

13. The electronic device of claim 8, wherein the at least one processor is configured to activate the HAC mode in response to a request for at least one of call receiving or call originating.

14. The electronic device of claim 8, wherein the at least one processor is configured to activate the HAC mode in response to powering on of the electronic device.

* * * * *